United States Patent
Xue et al.

(10) Patent No.: US 8,549,153 B2
(45) Date of Patent: Oct. 1, 2013

(54) METHOD AND DEVICE OF SESSION CONTROL

(75) Inventors: Haiqiang Xue, Beijing (CN); Gang Li, Beijing (CN); Xiaodong Duan, Beijing (CN); Bing Wei, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 368 days.

(21) Appl. No.: 13/002,288

(22) PCT Filed: Jun. 24, 2009

(86) PCT No.: PCT/CN2009/000707
§ 371 (c)(1),
(2), (4) Date: Apr. 11, 2011

(87) PCT Pub. No.: WO2010/000130
PCT Pub. Date: Jan. 7, 2010

(65) Prior Publication Data
US 2011/0185070 A1    Jul. 28, 2011

(30) Foreign Application Priority Data
Jul. 2, 2008   (CN) .......................... 2008 1 0116081

(51) Int. Cl.
*G06F 15/16* (2006.01)

(52) U.S. Cl.
USPC ........................................................ 709/227

(58) Field of Classification Search
USPC ........................................................ 709/227
See application file for complete search history.

(56) References Cited

U.S. PATENT DOCUMENTS

| | | | |
|---|---|---|---|
| 7,024,688 B1 * | 4/2006 | Faccin et al. ...................... | 726/4 |
| 2002/0103850 A1 * | 8/2002 | Moyer et al. .................. | 709/202 |
| 2004/0153555 A1 * | 8/2004 | Haverinen et al. ............ | 709/229 |
| 2007/0110058 A1 * | 5/2007 | Park .............................. | 370/389 |
| 2007/0209061 A1 * | 9/2007 | Dekeyzer et al. ................. | 726/3 |

FOREIGN PATENT DOCUMENTS

| | | |
|---|---|---|
| CN | 1968262 | 5/2007 |
| CN | 101141491 | 3/2008 |

OTHER PUBLICATIONS

International Search Report dated Oct. 15, 2009, PCT Patent Application No. PCT/CN2009/000707.

* cited by examiner

*Primary Examiner* — Wing F Chan
*Assistant Examiner* — David X Yi
(74) *Attorney, Agent, or Firm* — Vierra Magen Marcus LLP

(57) ABSTRACT

A method and device of session control are used to resolve the problem that when there is a failure in the session control function bound with the user, the UE can not re-login in time or the session can not be continued. In the flow of the user initial login, an address information of P-CSCF bound with the user in HSS is saved, so that when the user is called, an available S-CSCF can get the address information of P-CSCF bound with the called user from the HSS, and inform the user to do re-initial login according to the address information of P-CSCF or complete the session continuation; further, the address information of the user in D-HSS is saved, so that when the user is called, an available A-CSCF can get the address information of the called user from the D-HSS, and inform the user to do re-initial login according to the address information of the called user or complete the session continuation.

16 Claims, 12 Drawing Sheets

METHOD AND DEVICE OF SESSION CONTROL

FIELD OF THE INVENTION

The present invention relates to the field of IP Multimedia Subsystem (IMS) and particularly to a disaster recovery in a session control function.

BACKGROUND OF THE INVENTION

An IMS is a network architecture defined by the Third Generation Partnership Project (3GPP) and overlying a network in the circuit domain and the packet domain to provide a User Equipment (UE) with various services over an IP network.

The IMS involves primary function entities including a Call Session Control Function (CSCF) capable of UE registration control, session control, etc., and a Home Subscriber Server (HSS) for centralized management of UE subscription data. A user equipment accesses the IMS through a proxy node Proxy-Call Session Control Function (P-CSCF) in the domain where the UE is currently located and performs session and service trigger control through a Service-Call Session Control Function (S-CSCF) in the home domain.

Each UE who has subscribed for an IMS service is assigned with one or more IMS Private User Identities (IMPI) by a home network operator to be used for registration, authorization, management and charging and typically not to be open to the other UEs and is also provided with one or more IMS Public User Identities (IMPU) to be open to the other UEs and to be used for sessions of various services to identify himself or herself and another UE with whom he or she communicates.

Access flows of an IMS UE may include initial UE registration, renewed UE registration, UE de-registration, and network initiated renewed registration.

A UE initiated initial registration flow is as illustrated in FIG. 1:

a UE composes a REGISTER request message in the Session Initiation Protocol (SIP) from an IMPU, an IMPI, a Contact address and a home domain name stored in its own IMS Subscriber Identity Module (ISIM), where the register request message further includes the type and identifier information of an access network of the UE, information on an option of supported encryption and an integrity algorithm, and information on a port and a time-out period required to set up Security Association (SA) with a P-CSCF, and then transmits the register request message to a default address of the P-CSCF found by the UE during a finding process of P-CSCF;

upon reception of the register request message, the P-CSCF stores the identifier of the UE and other necessary information, makes a query about an address of an Interrogating-Call Session Control Function (I-CSCF) in the home domain of the UE according to the domain name of the home domain of the UE, and composes and then transmits a new REGISTER request message (including information on a visited network) to the address of the I-CSCF obtained from the query;

the I-CSCF inquires an HSS about the registration status of the UE according to the IMPI of the UE, and if the UE has not been registered, the I-CSCF may select an S-CSCF for processing the register request of the UE and transmit the register request message to the selected S-CSCF for further processing after selecting the S-CSCF;

the S-CSCF determines initial registration of the UE upon reception of the register request message and requests the HSS for assigning the UE with authentication vectors, which are the same as authentication vectors of a 3G UE in terms of their compositions and components, including a five-element vector of a Random Number (RAND), an Expected Response (XRES), an Authentication Token (AUTN), an Integrity Key (IK) and a Ciphering Key (CK). Upon reception of an assignment result from the HSS, the S-CSCF selects one of the authentication vectors to be included in a 401 message of the S-CSCF, removes the XRES item from the authentication vector and transmits the 401 message to the P-CSCF through the I-CSCF, where the 401 message typically includes the RAND, the AUTN, the IK and the CK;

the P-CSCF stores the CK and the IK and thereafter removes the CK and the IK from the authentication vector, and includes the remaining information into the 401 message and transmits it to the UE, where the 401 message primarily includes the RAND and the AUTH;

the UE calculates the CK, the IK and a Response (RES) from an authentication key shared with the network and the received RAND, and also may further process the CK in a selected encryption algorithm. After calculating the RES required for the network, the UE composes, encrypts, integrity-protects and then transmits a new REGISTER request message to the P-CSCF over a secure channel of the P-CSCF. The REGISTER request message includes the RAND, the AUTN and the UE-selected encryption algorithm used for the UE to perform calculation and the calculated authentication result RES;

the P-CSCF performs corresponding decryption on the REGISTER request message upon reception thereof, and if the register request can result from resolution, it indicates that the network and the UE have performed encryption and integrity-protection, and then the I-CSCF transmits the REGISTER request message including the authentication result to the S-CSCF, and upon reception of the REGISTER request message, the S-CSCF compares the RES therein and the previously stored XRES for consistency, and if they are consistent, it indicates that authentication is passed. The S-CSCF transmits to the HSS a Server-Assignment-Request (SAR) for the service registration information on an Initial Filter Criteria (iFC) of the UE, and the HSS updates the UE registration information with "Registered", stores the domain name information of the S-CSCF and also returns the iFC in a Server-Assignment-Answer (SAA) to the S-CSCF. Then, the S-CSCF transmits a 200 OK message to the UE to indicate successful registration, where the 200 OK message includes a network-designated period of valid registration in second (600000 seconds in the standard of 3GPP 24.229);

the P-CSCF initiates a flow of subscribing a registration period packet of the UE to the S-CSCF upon reception of the 200 OK response to the register request, and upon successful subscription, the S-CSCF returns 200 OK indicating successful subscription. Thus, the UE completes initial registration.

Assumed both a UE1 and a UE2 belong to the same IMS network and both of them support 100rel and Precondition, they can perform a session after performing initial registration described above, and as illustrated in FIG. 2, a session flow is as follows:

the UE1 transmits an INVITE session request to an S-CSCF1 through a P-CSCF1;

the S-CSCF1 transmits a domain name resolution request to a Domain Name Server (DNS) for the IP address of an I-CSCF2, and the S-CSCF1 transmits the INVITE session request to the I-CSCF2 according to the IP address of the I-CSCF2 returned from the DNS;

the I-CSCF2 transmits a Location-Info-Request (LIR) to the HSS through a reference point Cx for the domain name information of an S-CSCF2 bound with the UE2, and the HSS returns a Location-Info-Answer (LIA) including the domain name information of the S-CSCF2 bound with the UE2 through the reference point Cx;

the I-CSCF2 transmits a domain name resolution request to the DNS according to the domain name information of the S-CSCF2 returned from the HSS, and the DNS returns the IP address of the S-CSCF2 to the I-CSCF2;

the I-CSCF2 transmits the INVITE session request to the S-CSCF2 according to the IP address of the S-CSCF2 returned from the DNS, the S-CSCF2 forwards the INVITE session request to the UE2 through a P-CSCF2, and the UE2 transmits a message indicating an ongoing session to the UE1 over a path shown in the steps 10-14 in FIG. 2 to indicate that the UE1 and the UE2 may set up a session flow.

However, if a failure occurs with the I-CSCF2 and/or S-CSCF2 to which the UE2 belongs during the session, as illustrated in FIG. 3, the INVITE session request transmitted from the UE1 can not be transmitted to the UE2, thus failing to switch the session; and also due to a long period of time for renewed registration of the UE, approximately seven days (600000 seconds in the standard of 3GPP 24.229), timely renewed registration of the UE to an available call session control function can not be performed. If the UE2 does not initiates actively any call prior to renewed registration, the core network can not find the failure with the I-CSCF2 and/or S-CSCF2 to which the UE2 belongs, and consequently the UE2 can not be called successfully from any other UE.

SUMMARY OF THE INVENTION

Embodiments of the invention provide a session control method by which it is possible to notify a called UE of renewing initialized registration in time or switch a session to the called UE in the event that a relevant session control function controlling switching for the called UE fails.

An embodiment of the invention provides a session control method in an IMS, which includes:
  requesting, by a third Interrogation-Call Session Control Function, I-CSCF, a Domain Name Server, DNS, for address information of a second Service-Call Session Control Function, S-CSCF, bound with a second UE involved in a current session upon reception of a session request of a first UE transmitted from a first S-CSCF bound with the first UE;
  requesting, by the third I-CSCF, again the DNS for address information of an available third S-CSCF upon failing to transmit the session request of the first UE to the second S-CSCF according to the address information of the second S-CSCF;
  forwarding, by the third I-CSCF, the session request of the first UE to the third S-CSCF according to the address information of the third S-CSCF returned from the DNS; and
  instructing, by the third S-CSCF, the second UE to renew initialized registration through a second Proxy-Call Session Control Function, P-CSCF, bound with the second UE according to address information of the second P-CSCF, or obtaining service registration information iFC of the second UE from an HSS and switching the current session to the second UE according to the address information of the second P-CSCF bound with the second UE and the iFC.

Preferably, the third I-CSCF obtains the address information of the second P-CSCF from the HSS and carries the address information of the second P-CSCF in the session request forwarded to the third S-CSCF; or the third S-CSCF obtains the address information of the second P-CSCF together with the service registration information iFC of the second UE from the HSS.

Preferably, before the third I-CSCF receives the session request of the first UE transmitted from the first S-CSCF bound with the first UE, the method further includes:
  obtaining, by the first S-CSCF, address information of a second I-CSCF to which the second UE belongs from the DNS upon reception of the session request of the first UE, and forwarding the session request of the first UE to the second I-CSCF; and
  requesting again the DNS for address information of the available third I-CSCF upon failing to forward the session request of the first UE, and transmitting the session request of the first UE to the third I-CSCF according to the address information of the third I-CSCF.

Preferably, the third S-CSCF further notifies the first UE of a failure of switching the session through the second P-CSCF bound with the second UE after instructing the second UE to renew initialized registration through the second P-CSCF according to the address information of the second P-CSCF.

An embodiment of the invention provides a session control device in an IMS, which includes:
  a unit configured to obtain, from an HSS, domain name information of a second S-CSCF bound with a second UE involved in a current session upon reception of a session request of a first UE transmitted from a first S-CSCF bound with the first UE;
  a unit configured to request again a DNS for address information of an available third S-CSCF upon failing to transmit the session request of the first UE to the second S-CSCF according to the domain name information of the second S-CSCF;
  a unit configured to forward the session request of the first UE to the third S-CSCF according to the address information of the third S-CSCF returned from the DNS; and
  a unit configured to instruct the second UE to renew initialized registration through a second P-CSCF bound with the second UE according to address information of the second P-CSCF, or a unit configured to obtain, from the HSS, service registration information iFC of the second UE and switch the current session to the second UE according to the address information of the second P-CSCF bound with the second UE and the iFC.

An embodiment of the invention further provides a session control method in an IMS, includes:
  requesting, by a third I-CSCF, an Enhanced-Domain Name Server, E-DNS, for address information of a second S-CSCF bound with a second UE involved in a current session upon reception of a session request of a first UE transmitted from a first S-CSCF bound with the first UE;
  transmitting, by the E-DNS, address information of an available third S-CSCF to the third I-CSCF upon determining, from results of monitoring S-CSCFs, that the second S-CSCF fails;
  forwarding, by the third I-CSCF, the session request of the first UE to the third S-CSCF according to the address information of the third S-CSCF returned from the E-DNS; and
  instructing, by the third S-CSCF, the second UE to renew initialized registration through a second P-CSCF bound with the second UE according to address information of the second P-CSCF, or obtaining service registration information iFC of the second UE from an HSS and switching the current session to the second UE according to the address information of the second P-CSCF bound with the second UE and the iFC.

An embodiment of the invention further provides a session control device in an IMS, which includes:
a unit configured to request an E-DNS for address information of a second S-CSCF bound with a second UE involved in a current session upon reception of a session request of a first UE transmitted from a first S-CSCF bound with the first UE;
a unit configured to transmit address information of an available third S-CSCF to a third I-CSCF upon determining, from results of monitoring S-CSCFs, that the second S-CSCF fails;
a unit configured to forward the session request of the first UE to the third S-CSCF according to the address information of the third S-CSCF returned from the E-DNS; and
a unit configured to instruct the second UE to renew initialized registration through a second P-CSCF bound with the second UE according to the address information of the second P-CSCF, or a unit configured to obtain, from an HSS, service registration information iFC of the second UE and switch the current session to the second UE according to the address information of the second P-CSCF bound with the second UE and the iFC.

An embodiment of the invention provides a session control method in the next generation IMS, which includes:
obtaining, by a first Access-Control Session Control Function, A-CSCF, bound with a first UE, domain name information of a second A-CSCF bound with a second UE involved in a current session from a Distributed-Home Subscriber Server, D-HSS, upon reception of a session request of the first UE;
requesting, by the first A-CSCF, again a Domain Name Server, DNS, for address information of an available third A-CSCF upon failing to forward the session request of the first UE to the second UE through the second A-CSCF according to the domain name information of the second A-CSCF;
forwarding, by the first A-CSCF, the session request of the first UE to the third A-CSCF according to the address information of the third A-CSCF returned from the DNS; and
instructing, by the third A-CSCF, the second UE to renew initialized registration according to address information of the second UE, or obtaining service registration information iFC of the second UE from the D-HSS and switching the current session to the second UE according to the address information and iFC of the second UE.

An embodiment of the invention provides a session control device in the next generation IMS, which includes:
a unit configured to obtain from a D-HSS domain name information of a second A-CSCF bound with a second UE involved in a current session when a first A-CSCF bound with a first UE receives a session request of the first UE;
a unit configured to request again a DNS for address information of an available third A-CSCF upon failing to forward the session request of the first UE to the second UE through the second A-CSCF according to the domain name information of the second A-CSCF;
a unit configured to forward the session request of the first UE to the third A-CSCF according to the address information of the third A-CSCF returned from the DNS; and
a unit configured to instruct the second UE to renew initialized registration according to address information of the second UE, or a unit configured to obtain the service registration information iFC of the second UE from the D-HSS and switch the current session to the second UE according to the address information and iFC of the second UE.

An embodiment of the invention further provides a session control method in the next generation IMS, which includes:
obtaining, by a first A-CSCF bound with a first UE, domain name information of a second A-CSCF bound with a second UE involved in a current session from a D-HSS upon reception of a session request of the first UE, and transmitting to an E-DNS a request for resolving the domain name information of the second A-CSCF;
transmitting, by the E-DNS, address information of an available third A-CSCF to the first A-CSCF upon determining, from results of monitoring A-CSCFs, that the second A-CSCF fails;
forwarding, by the first A-CSCF, the session request of the first UE to the third A-CSCF according to the address information of the third A-CSCF; and
instructing, by the third A-CSCF, the second UE to renew initialized registration according to address information of the second UE, or obtaining service registration information iFC of the second UE from the D-HSS and switching the current session to the second UE according to the address information and iFC of the second UE.

An embodiment of the invention further provides a session control device in the next generation IMS, which includes:
a unit configured to obtain from a D-HSS domain name information of a second A-CSCF bound with a second UE involved in a current session when a first A-CSCF bound with a first UE receives a session request of the first UE and transmit to an E-DNS a request for resolving the domain name information of the second A-CSCF;
a unit configured to transmit address information of an available third A-CSCF to the first A-CSCF upon determining, from results of monitoring A-CSCFs, that the second A-CSCF fails;
a unit configured to forward the session request of the first UE to the third A-CSCF according to the address information of the third A-CSCF; and
a unit configured to instruct the second UE to renew initialized registration according to address information of the second UE, or a unit configured to obtain service registration information iFC of the second UE from the D-HSS and switch the current session to the second UE according to the address information and iFC of the second UE.

With the session control in an IMS according to the embodiments of the invention, in an initial registration flow of the UE, the address information of a P-CSCF bound with the UE is stored into an HSS so that when the UE is called, an available S-CSCF can obtain the address information of the P-CSCF bound with the called UE from the HSS and instruct the UE to renew initialized registration or switch a session according to the address information of the P-CSCF.

Furthermore, with the session control in the next generation IMS according to the embodiments of the invention, the address information of the UE is stored into a D-HSS so that when the UE is called, an available A-CSCF can obtain the address information of the called UE from the D-HSS and instruct the UE to renew initialized registration or switch a session according to the address information of the called UE.

DETAILED DESCRIPTION OF THE EMBODIMENTS

In order to address the problem in an IMS that if an S-CSCF selected by a domain name server for a called UE fails during a session, the called UE can not be called prior to renewed initialized registration thereof, address information of a P-CSCF bound with a UE is stored into an HSS of an access network system to thereby ensure that an available S-CSCF requested again for can instruct the called UE to renew initialized registration or switch the session according to the address information of the P-CSCF bound with the UE according to embodiments of the invention.

In embodiments of the invention, a P-CSCF, an S-CSCF and an I-CSCF can be integrated into a session control function referred to as an A-CSCF in the next generation IMS. In order to address the problem that if an A-CSCF bound with a called UE fails during a session, the called UE can not be called according to the A-CSCF bounded therewith, address information, IK and CK of the UE are stored upon registration of the UE into a D-HSS adopted for an access network system to thereby ensure that an available A-CSCF requested again for can instruct the called UE to renew initialized registration or switch the session according to the address information, IK and CK of the UE.

Various embodiments of the invention will be detailed below with reference to the drawings.

The First Embodiment

Figure 1:
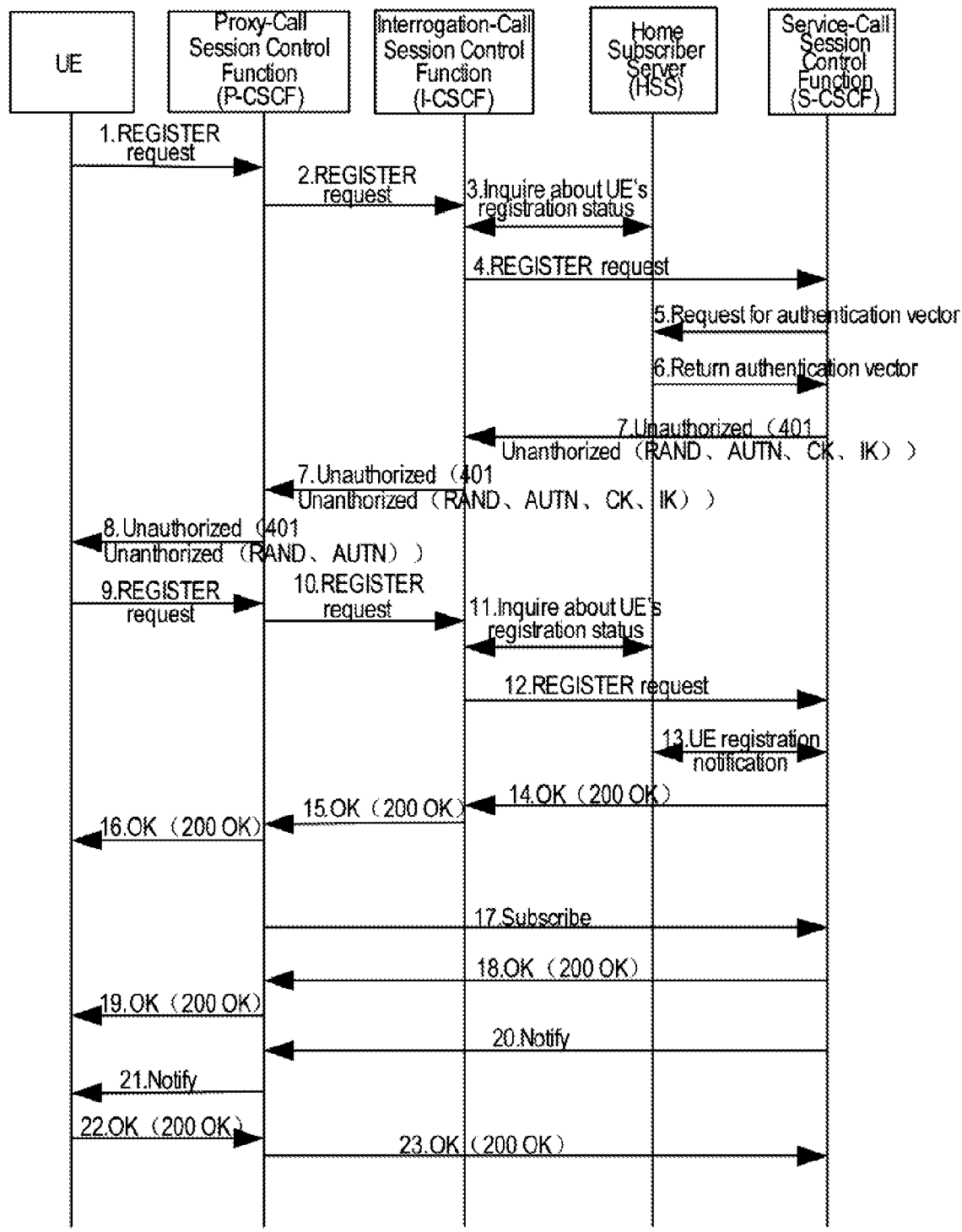
FIG. 1 illustrates a flow chart of initial registration of a UE in the prior art.
Figure 2:
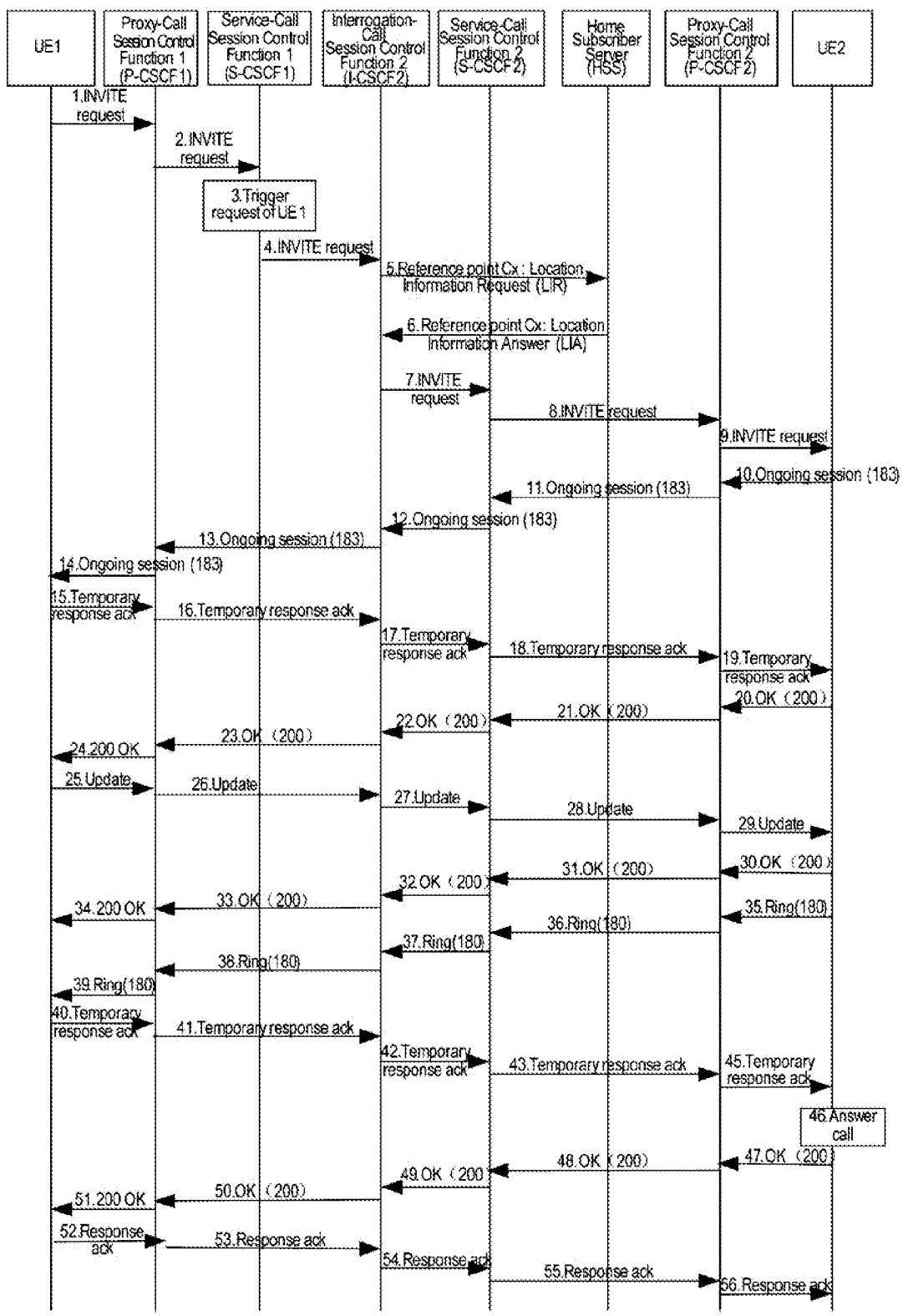
FIG. 2 illustrates a flow chart of a session between two UEs in the prior art.
Figure 3:
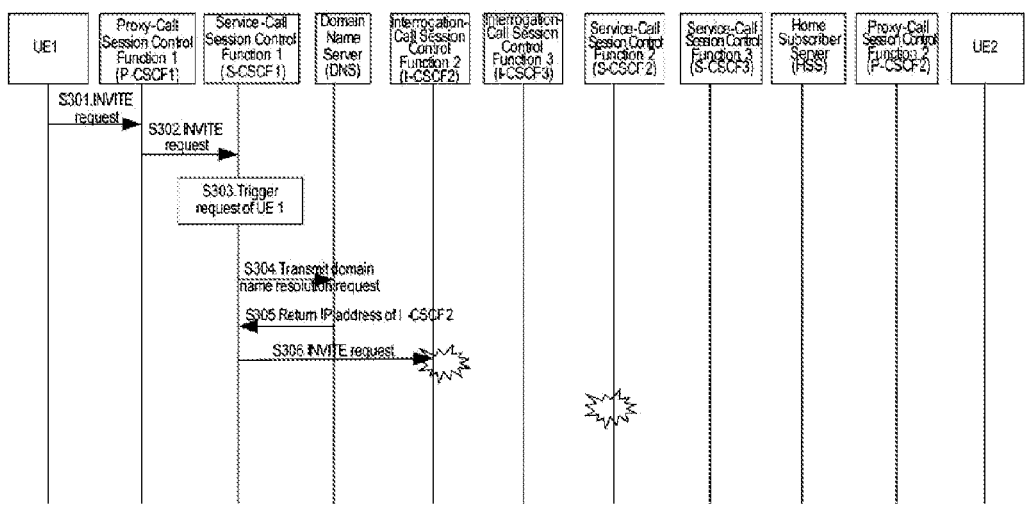
FIG. 3 illustrates a schematic flow chart of a failing session control function in the prior art.
Figure 4A:
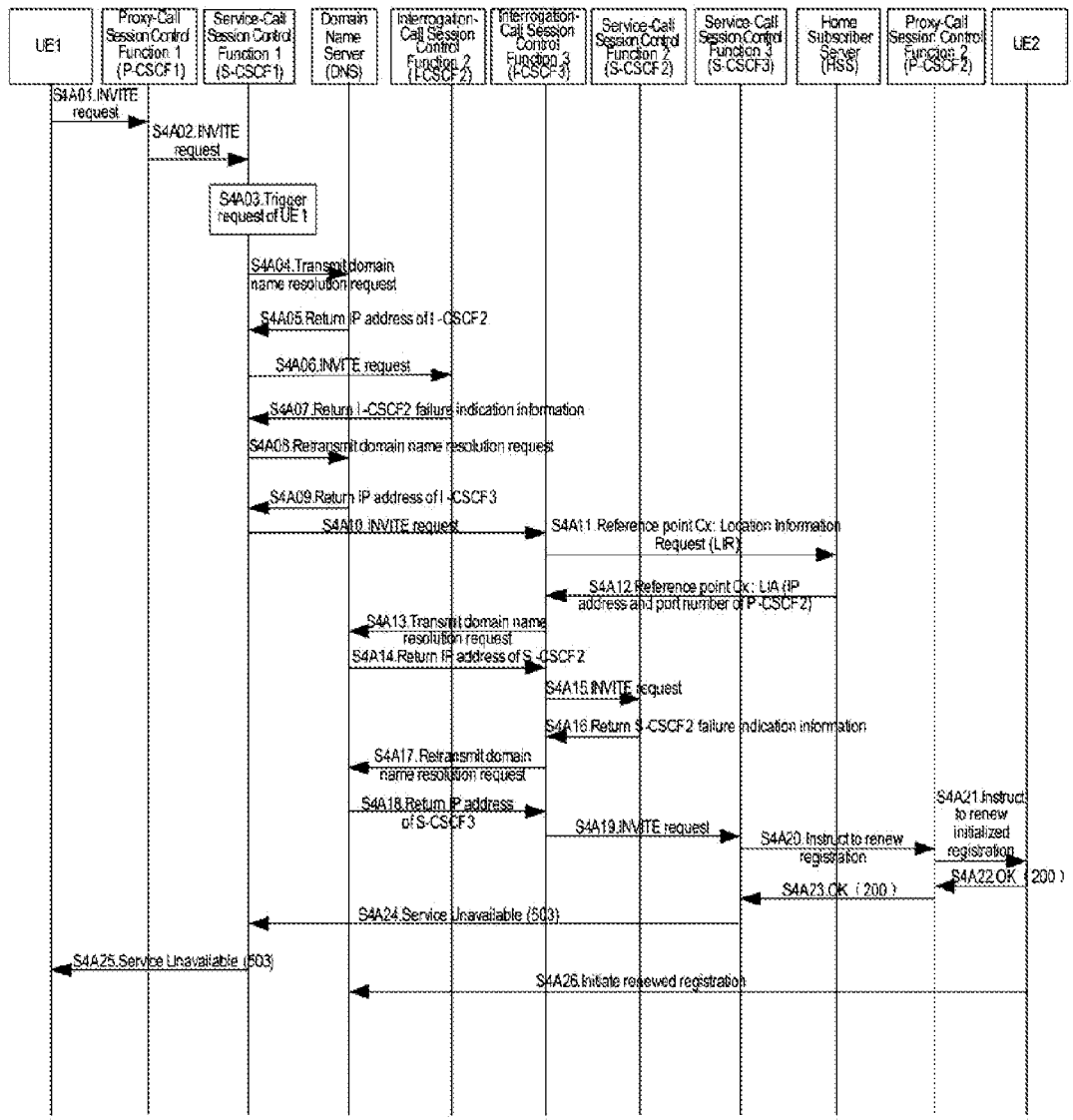
FIGS. 4A and 4B illustrate schematic flow charts of two session control methods according to a first embodiment of the invention respectively.

As illustrated in FIG. 4A, a first session control method according to the first embodiment of the invention includes the following steps:

in steps S4A01 and S4A02, a UE1 transmits a session request to an S-CSCF1 through a P-CSCF1;

where the session request transmitted from the UE1, e.g., an INVITE session request, includes an IMPU of an UE2, e.g., Bob@home.net;

in step S4A03, the S-CSCF1 triggers a service request of the UE1 according to the service registration information iFC of the UE1 which is obtained during registration of the UE1;

in steps S4A04 and S4A05, the S-CSCF1 transmits a domain name resolution request to an DNS, and the DNS returns to the S-CSCF1 an IP address assigned to an I-CSCF2;

where the S-CSCF1 transmits the domain name resolution request to the DNS according to the IMPU of the UE2 in the session request, and the DNS returns to the S-CSCF the IP address assigned to the I-CSCF2;

in steps S4A06 and S4A07, the S-CSCF1 transmits the INVITE session request to the I-CSCF2, and if the transmission fails, the I-CSCF2 returns information indicating the failure of the I-CSCF2 to the S-CSCF1;

where the S-CSCF1 transmits the INVITE session request to the I-CSCF2 according to the IP address of the I-CSCF2 returned from the DNS, and if the S-CSCF1 fails to transmit the session request to the I-CSCF2, the I-CSCF2 returns the information indicating the failure of the I-CSCF2 to the S-CSCF1;

in steps S4A08 and S4A09, the S-CSCF1 retransmits a domain name resolution request including the information indicating the failure of the I-CSCF2 to the DNS, and according to the information indicating the failure of the I-CSCF2, the DNS reassigns an available I-CSCF3 and returns an IP address of the I-CSCF3 to the S-CSCF1;

in step S4A10, the S-CSCF1 transmits the INVITE session request to the reselected I-CSCF3 according to the IP address of the I-CSCF3 returned from the DNS;

in step S4A11, the I-CSCF3 transmits an LIR to an HSS through a reference point Cx;

where during initial registration of a UE, the HSS stores the address information of P-CSCFs bound with the UEs, which primarily includes the IP addresses and port number of the P-CSCFs. The IP addresses and port number of the P-CSCFs will be taken as an example throughout the following description. Therefore, the I-CSCF3 may obtain the address information of the P-CSCF2 upon transmission of the LIR to the HSS.

in step S4A12, the HSS returns an LIA including the address information of the P-CSCF2 to the I-CSCF3 through the reference point Cx;

in steps S4A13 and S4A14, the I-CSCF3 transmits a domain name resolution request to the DNS, and the DNS returns an IP address of an S-CSCF2 to the I-CSCF3;

in steps S4A15 and S4A16, the I-CSCF3 transmits the INVITE session request to the S-CSCF2 according to the IP address of the S-CSCF2 returned from the DNS, and if the I-CSCF3 fails to transmit the session request to the S-CSCF2, the S-CSCF2 returns information indicating the failure of the S-CSCF2 to the I-CSCF3;

in steps S4A17 and S4A18, the I-CSCF3 retransmits to the DNS a domain name resolution request including the information indicating the failure of the S-CSCF2, and the DNS reselects an available S-CSCF3 according to the information indicating the failure of the S-CSCF2 and returns the IP address of the S-CSCF3 to the I-CSCF3;

in step S4A19, the I-CSCF3 transmits the INVITE session request to the S-CSCF3 including the IP address and port number of the P-CSCF2 according to the IP address of the S-CSCF3 returned from the DNS;

in steps S4A20 and S4A21, the S-CSCF3 transmits a Notify notice to the UE2 through the P-CSCF2;

where upon reception of the INVITE session request from the I-CSCF3, the S-CSCF3 determines, from a correspondence relationship between an S-CSCF, a P-CSCF and a registered UE resulting from registration of the UE, that the UE2 has not been registered with the S-CSCF3, and then transmits the Notify notice to the P-CSCF2 according to the address information of the P-CSCF2 in the INVITE session request, and the P-CSCF2 forwards the Notify notice to the UE2 to trigger a flow of renewing initialized registration of the UE2;

in steps S4A22 and S4A23, the UE2 transmits 200 OK to the S-CSCF3 through the P-CSCF2 to indicate successful reception of the notice to renew initialized registration;

in steps S4A24 and S4A25, the S-CSCF3 transmits 503 Service Unavailable to the UE1 through the S-CSCF1 to indicate that the UE2 has not been registered with the S-CSCF3, so no session can be set up with the UE2, thus failing to switch a session; and in step S4A26, the UE2 requests the DNS again to obtain address information of another S-CSCF from resolution and then initiates a flow of renewing initialized registration to thereby ensure that the UE2 can be called successfully from another UE.

The flow of renewing initialized registration is the same as a renewed registration process in the prior art and a repeated description thereof is omitted here.

Figure 4B:
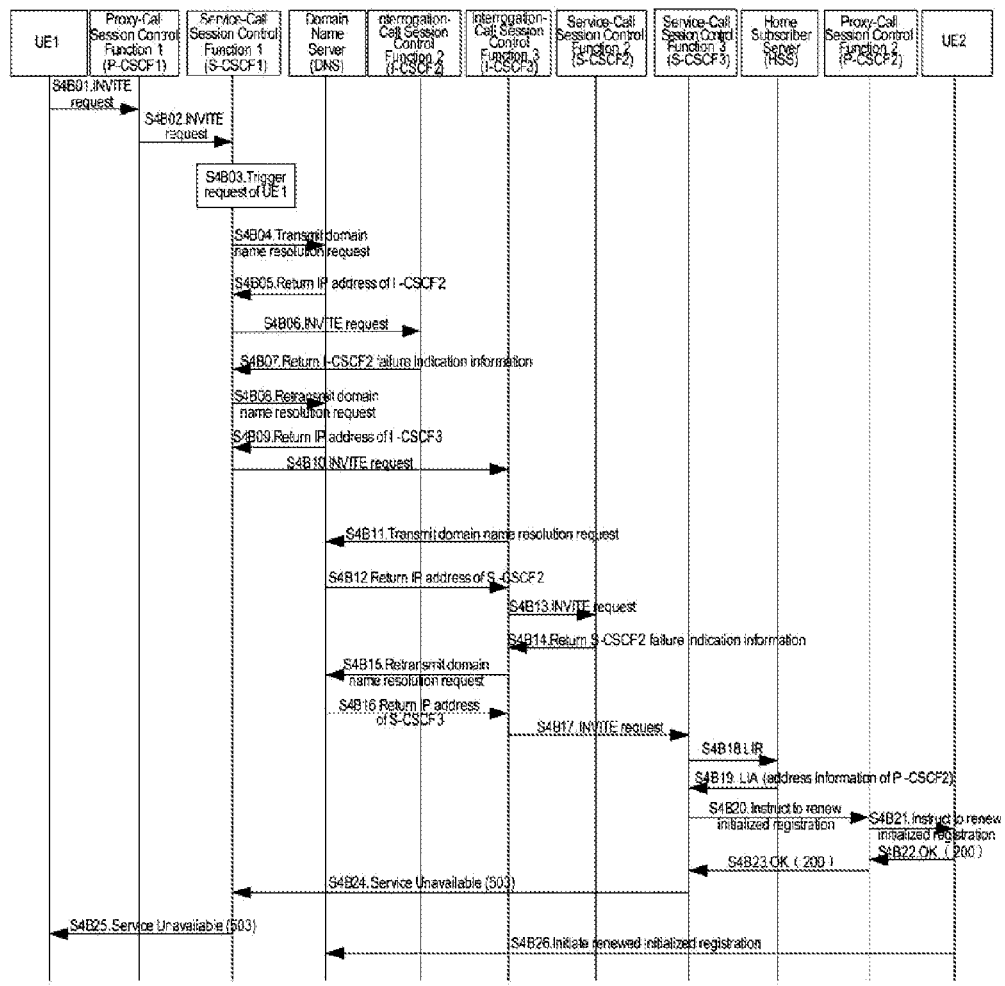

As illustrated in FIG. 4B, a second session control method according to the first embodiment of the invention includes the following steps:

where steps S4B01-S4B10 are the same as the corresponding steps S4A01-S4A10 in FIG. 4A and steps S4B20-S4B26 are the same as the corresponding steps S4A20-S4A26 in FIG. 4A, so a repeated description thereof is omitted here and only the differences will be detailed below:

S4B11. the I-CSCF3 transmits to the DNS a domain name resolution request for the address information of the S-CSCF2;

S4B12. the DNS returns the address information of the S-CSCF2 to the I-CSCF3;

S4B13 and S4B14. the I-CSCF3 forwards the session request to the S-CSCF2 according to the address information of the S-CSCF2 returned from the DNS, and the S-CSCF2 returns the failure indication information to the I-CSCF3;

S4B15 and S4B16. the I-CSCF3 retransmits a domain name resolution request carrying the information indicating the failure of the S-CSCF2 to the DNS, and the DNS selects and returns to the I-CSCF3 the address information of the available S-CSCF3 according to the failure indication information carried in the domain name resolution request;

S4B17. the I-CSCF3 forwards the session request of the UE1 to the S-CSCF3;

S4B18. the S-CSCF3 transmits through the reference point to the HSS the LIR for the IP address and port number of the P-CSCF2; and S4B19. the HSS returns the address information of the P-CSCF2 to the S-CSCF3.

The first embodiment of the invention further provides a session control device in an IMS, which includes:

a unit configured to obtain, from an HSS, domain name information of a second S-CSCF bound with a second UE involved in a current session upon reception of a session request of a first UE transmitted from a first S-CSCF bound with the first UE;

a unit configured to request again a DNS for address information of an available third S-CSCF upon failing to transmit the session request of the first UE to the second S-CSCF according to the domain name information of the second S-CSCF;

a unit configured to forward the session request of the first UE to the third S-CSCF according to the address information of the third S-CSCF returned from the DNS; and a unit configured to instruct the second UE to renew initialized registration through a second P-CSCF bound with the second UE according to address information of the second P-CSCF.

The Second Embodiment

Figure 5:
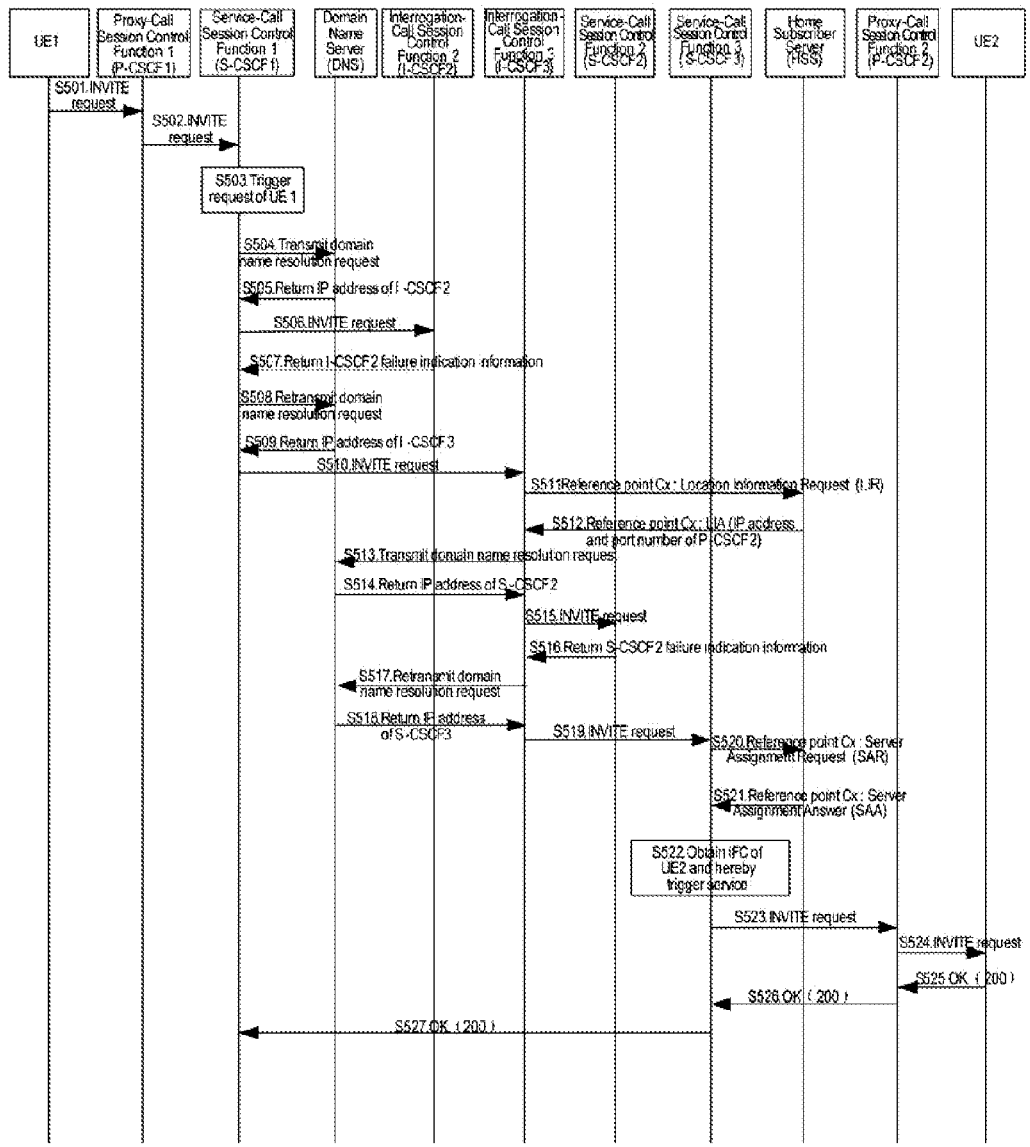
FIG. 5 illustrates a schematic flow chart of a session control method according to a second embodiment of the invention.

As illustrated in FIG. 5, a session control method according to the second embodiment of the invention includes the following steps:

where steps S501-S519 are the same as the corresponding steps S4A01-S4A19 in FIG. 4A, so a repeated description thereof is omitted here and only the differences will be detailed below:

in step S520, the S-CSCF3 transmits the SAR to the HSS through the reference point Cx;

where the SAR transmitted from the S-CSCF3 includes UE2 SIP URI and S-CSCF3 SIP, and the service registration information iFC of the UE2 is obtained from the HSS;

where the S-CSCF3 may obtain the iFC in various ways, for example, by copying, downloading, etc., from the HSS;

in step S521, the HSS returns the SAA to the S-CSCF3 through the reference point Cx;

where the HSS detects, from the received SAR, whether the registration status of the UE2 is "Registered", and if so, the HSS has stored the information on UE2 SIP URI and S-CSCF3 SIP and returns the SAA including the iFC of the UE2 to the S-CSCF3 through the reference point Cx;

in step S522, the S-CSCF3 triggers the session request of the UE2 according to the obtained iFC of the UE2, and since the S-CSCF3 has obtained the iFC of the UE2, the S-CSCF3 may forward the INVITE session request of the UE1 to the UE2;

in steps S523 and S524, the S-CSCF3 transmits the INVITE session request to the UE2 through the P-CSCF2 according to the iFC of the UE2 and the obtained address information of the P-CSCF2 bound with the UE2;

where it shall be noted that alike the two embodiments in FIGS. 4A and 4B, the S-CSCF3 may obtain the address information of the P-CSCF2 from the received session request or download the IP address and port number of the P-CSCF2 from the HSS upon reception of the session request to thereby obtain the address information of the P-CSCF2 in the second embodiment of the invention;

in steps S525-S527, the UE2 returns 200 OK to the S-CSCF1 through the P-CSCF2 to indicate successful switching of the session upon reception of the INVITE session request, and then the UE1 and the UE2 may perform the current session. A session flow thereof is the same as that in the prior art and a repeated description thereof is omitted here.

The second embodiment of the invention further provides a session control device in an IMS, which includes:

a unit configured to obtain, from a HSS, domain name information of a second S-CSCF bound with a second UE involved in a current session upon reception of a session request of a first UE transmitted from a first S-CSCF bound with the first UE;

a unit configured to request again a DNS for address information of an available third S-CSCF upon failing to transmit the session request of the first UE to the second S-CSCF according to the domain name information of the second S-CSCF;

a unit configured to forward the session request of the first UE to the third S-CSCF according to the address information of the third S-CSCF returned from the DNS; and a unit configured to obtain, from the HSS, service registration information iFC of the second UE and switch the current session to the second UE according to address information of a second P-CSCF bound with the second UE and the iFC of the second UE.

The Third Embodiment

In the present embodiment, a traditional DNS is replaced with an Enhanced Domain
Name Server (E-DNS), which may perform the following functions as compared with the traditional DNS.

Figure 6:
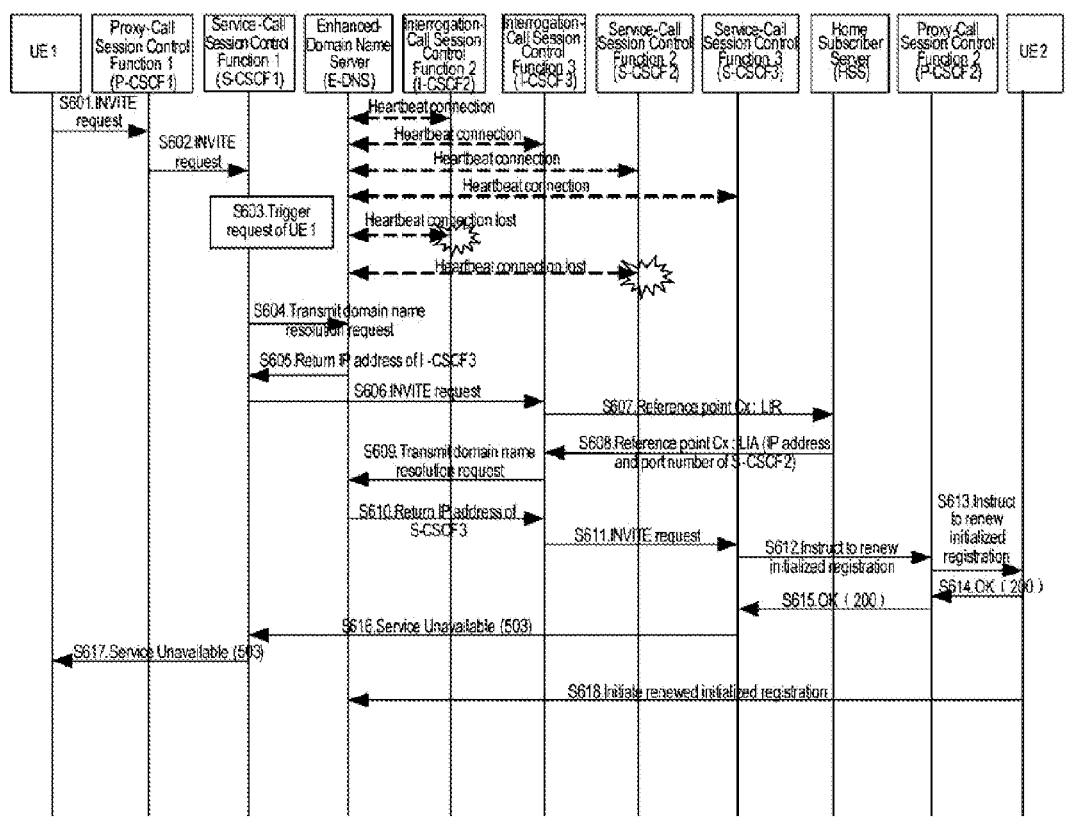
FIG. 6 illustrates a schematic flow chart of a session control method according to a third embodiment of the invention.

The E-DNS may monitor in real time the statuses of I-CSCFs and S-CSCFs, i.e., set up connections with the I-CSCFs and S-CSCFs in a specific region, possibly in a heartbeat monitoring method. Typically, an application layer based heartbeat monitoring method is based upon the User Datagram Protocol (UDP), and due to a low overhead of the UDP, real time monitoring may be performed, for example, in a period of 1 s. Alternatively, another monitoring method may be used, for example, a monitoring mechanism performed in a protocol at the transmission layer, and this monitoring method is similar to the UDP-based heartbeat monitoring method, for example, a Keep-alive monitoring method in the Transmission Control Protocol (TCP) with a typical monitoring period of 60 s, a heartbeat monitoring method in the Streaming Control Transmission Protocol (SCTP) with a typical monitoring period of 30 s. When a UE initiates a initial session request, if it is found that an I-CSCF and/or an S-CSCF fails, an available I-CSCF and/or S-CSCF may be selected in a load-balance policy as a session control function. Thus as illustrated in FIG. 6, a session control method according to the third embodiment of the invention includes the following steps:

where steps S601-S603 are the same as the corresponding steps S4A01-S4A03 in FIG. 4A and steps S611-S618 are the same as the corresponding steps S4A19-S4A26 in FIG. 4A, so a repeated description thereof is omitted here and only the differences will be detailed below:

in steps S604 and S605, the S-CSCF1 transmits to the E-DNS a domain name resolution request for the address information of the I-CSCF3;

where the S-CSCF1 requests the E-DNS for resolving the domain name of the I-CSCF2, and the E-DNS monitors and determines that the I-CSCF2 fails and returns the IP address of the available I-CSCF3 to the S-CSCF1;

where the E-DNS may monitor the statuses of the I-CSCFs and the S-CSCFs in a specific region in a heartbeat monitoring method or a Keep-alive monitoring method. That is, the E-DNS may set up a heartbeat or keep-alive connection with the I-CSCF and the S-CSCF of a called UE to have a knowledge of the load conditions of the I-CSCF and the S-CSCF, and if the I-CSCF or the S-CSCF fails, the E-DNS identifies the I-CSCF or the S-CSCF as "Unavailable" and selects duly an available I-CSCF or an available S-CSCF as a session control function for the UE;

in step S606, the S-CSCF1 forwards the INVITE session request to the available I-CSCF3 according to the IP address of the I-CSCF3 returned from the E-DNS;

in step S607, the I-CSCF3 transmits through the reference point Cx to the HSS the LIR for the address information of the S-CSCF2 bound with the UE2 from the HSS, the address information includes the IP address and the port number.

in step S608, the HSS returns the LIA to the I-CSCF3 through the reference point Cx;

where the returned LIA carries the address information of the S-CSCF2;

in steps S609 and S610, the I-CSCF3 requests the E-DNS for the address information of the S-CSCF2; and the E-DNS monitors and detects that the S-CSCF2 corresponding to registration of the UE fails and returns the IP address of the available S-CSCF3 to the I-CSCF3.

It shall be noted that the S-CSCF3 may obtain the address information of the P-CSCF2 from the received session request or download the IP address and port number of the P-CSCF2 from the HSS upon reception of the session request to obtain the address information of the P-CSCF2.

The third embodiment of the invention further provides a session control device in an IMS, which includes:

a unit configured to request an E-DNS for address information of a second S-CSCF bound with a second UE involved in a current session upon reception of a session request of a first UE transmitted from a first S-CSCF bound with the first UE;

a unit configured to transmit address information of an available third S-CSCF to a third I-CSCF upon determining, from results of monitoring S-CSCFs, that the second S-CSCF fails;

a unit configured to forward the session request of the first UE to the third S-CSCF according to the address information of the third S-CSCF returned from the E-DNS; and a unit configured to instruct the second UE to renew initialized registration through a second P-CSCF bound with the second UE according to address information of the second P-CSCF.

The Fourth Embodiment

Figure 7:
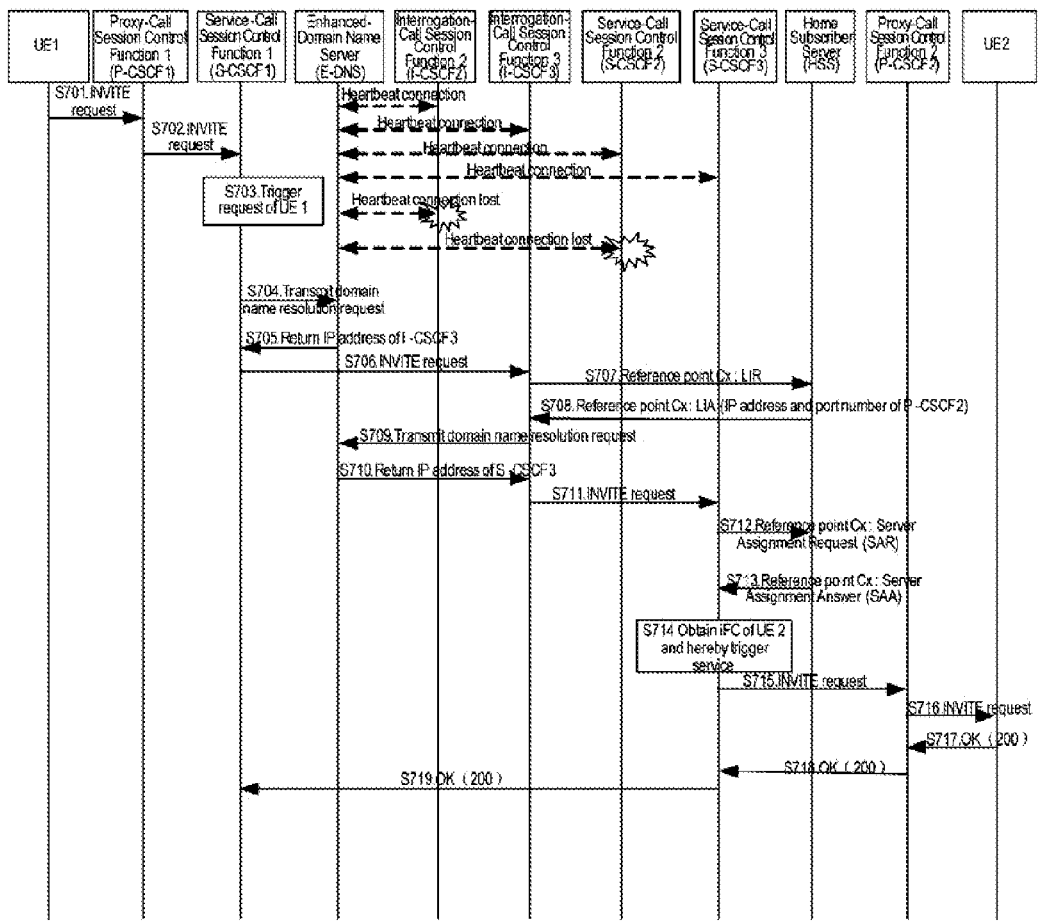
FIG. 7 illustrates a schematic flow chart of a session control method according to a fourth embodiment of the invention.

As illustrated in FIG. 7, the fourth embodiment of the invention provides a session control method, and steps S701-S711 are the same as the corresponding steps S601-S611 in the third embodiment and steps S712-S719 are the same as the corresponding steps S520-S527 in the second embodiment, so a repeated description thereof is omitted here.

It shall be noted that the S-CSCF3 may obtain the address information of the P-CSCF2 from the received session request or from the HSS.

The fourth embodiment of the invention further provides a session control device in an IMS, which includes:

a unit configured to request an E-DNS for address information of a second S-CSCF bound with a second UE involved in a current session upon reception of a session request of a first UE transmitted from a first S-CSCF bound with the first UE;

a unit configured to transmit address information of an available third S-CSCF to a third I-CSCF upon determining, from results of monitoring S-CSCFs, that the second S-CSCF fails;

a unit configured to forward the session request of the first UE to the third S-CSCF according to the address information of the third S-CSCF returned from the E-DNS; and a unit configured to obtain, from an HSS, service registration information iFC of the second UE and switch the session to the second UE according to address information of a second P-CSCF bound with the second UE and the iFC.

With the session control in an IMS according to the embodiments of the invention, the address information of a P-CSCF bound with a UE is stored into an HSS in an initial registration flow of the UE so that when the UE is called, an available S-CSCF may obtain the address information of the P-CSCF bound with the called UE from the HSS and instruct the called UE to renew initialized registration or switch a session according to the obtained address information of the P-CSCF.

The Fifth Embodiment

Based upon the methods according to the foregoing embodiments, the inventors identify that the session flow based upon an IMS logic architecture is rather complex and then propose a Next Generation IP Multimedia Subsystem (NGIMS) logic architecture and also identify that the foregoing disaster discovery of a session control device is equally applicable to the NGIMS.

In the NGIMS, there are primarily two control functions, an Access-Call Session Control Function (A-CSCF) and a Distributed Home Subscriber Server (D-HSS), both of which exist at the session control layer.

The A-CSCF in the NGIMS includes the functions of an I-CSCF, an S-CSCF and a P-CSCF in the IMS, that is, a control function A-CSCF is integrated with the functions of the three control functions, an I-CSCF, an S-CSCF and a P-CSCF, to thereby simply the logic architecture of the system.

The D-HSS stores therein both service registration information iFC of a UE, domain name information of an A-CSCF bound with a UE when the UE is registered, and address information and cipher information of the UE. The address information of the UE primarily includes an IP address and port number of the UE. The IP address and port number of the UE will be taken as an example throughout the following description. Typically, the cipher information includes a pair of IK and CK.

Figure 8:
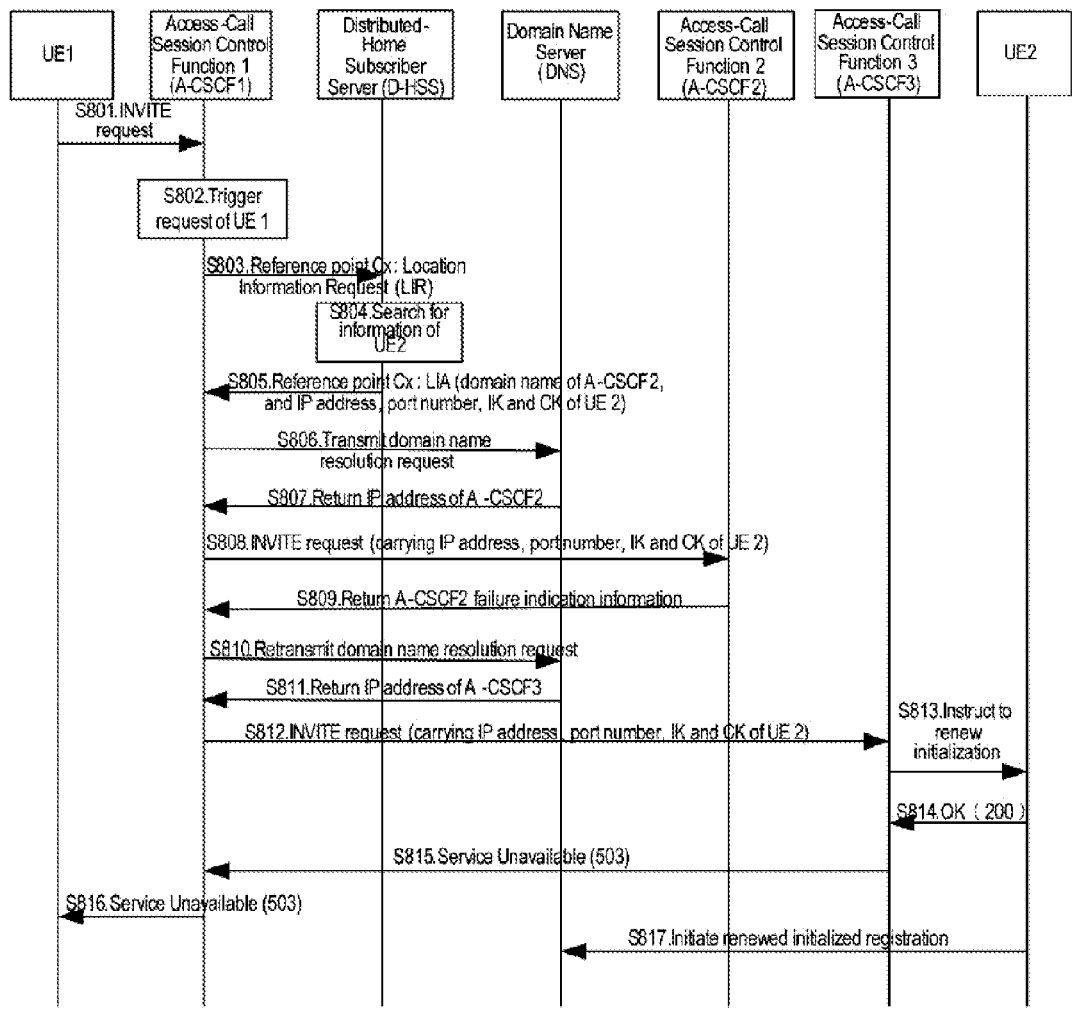
FIG. 8 illustrates a schematic flow chart of a session control method according to a fifth embodiment of the invention.

As illustrated in FIG. 8, a flow of a session control method according to the fifth embodiment of the invention includes the following steps:

in step S801, a UE1 transmits an INVITE session request (including To: Bob@home.net) to an A-CSCF1 bound with the UE1;

in step S802, the A-CSCF1 triggers a session request of the UE1 to a UE2 according to the iFC of the UE1 upon reception of the INVITE session request;

in step S803, the A-CSCF1 transmits through a reference point Cx to a D-HSS an LIR (including Bob@home.net) for address information and cipher information of the UE2 and domain name information of an A-CSCF2 from the D-HSS;

in steps S804 and S805, the D-HSS returns the LIA to the A-CSCF1 through the reference point Cx;

where the D-HSS searches data stored throughout the network for the domain name information of the A-CSCF2 bound with the UE2 and the address information and cipher information of the UE2 according to the received LIR;

in step S806, the A-CSCF1 transmits to the DNS a request for resolving the domain name information of the A-CSCF2 according to the domain name information of the A-CSCF2 returned from the D-HSS;

in step S807, the DNS returns the IP address of the A-CSCF2 to the A-CSCF1;

in steps S808 and S809, the A-CSCF1 forwards the INVITE session request including the address information and cipher information of the UE2 to the A-CSCF2 according to the IP address of the A-CSCF2 returned from the DNS, and if the A-CSCF1 fails to forward the INVITE session request to the A-CSCF2, the A-CSCF2 returns information indicating the failure of the A-CSCF2 to the A-CSCF1;

in step S810, the A-CSCF1 retransmits a domain name resolution request to the DNS according to the failure indication information;

in step S811, the DNS returns address information of an available A-CSCF3 to the A-CSCF 1 according to the information indicating the failure of the A-CSCF2;

in step S812, the A-CSCF1 forwards the INVITE session request including the address information and cipher information of the UE2 to the A-CSCF3 upon reception of the address information of the A-CSCF3 returned from the DNS;

in step S813, upon reception of the INVITE session request, the A-CSCF3 determines, from a correspondence relationship between an A-CSCF and a registered UE resulting from registration of the UE, that the UE2 has not been registered with the A-CSCF3, and then transmits a Notify notice to the UE2 to trigger the UE2 to renew initialized registration;

where since the session request received by the A-CSCF3 carries the address information of the UE2, the A-CSCF3 may transmit the Notify notice to the UE2 in time to thereby ensure that the UE2 may be called successfully from another UE after timely renewing of initialized registration;

in step S814, the UE2 returns 200 OK to the A-CSCF3 to indicate successful reception of the notice to renew initialized registration upon reception of the Notify notice transmitted from the A-CSCF3;

in steps S815 and S816, the A-CSCF3 transmits 503 Service Unavailable to the UE1 through the A-CSCF1 to indicate that the UE2 has not been registered with the A-CSCF3, so no session can be set up with the UE2, thus failing to switch a session; and in step S817, the UE2 requests the DNS again to obtain address information of another A-CSCF from resolution and then initiates a flow of renewing initialized registration to thereby ensure that the UE2 may be called successfully from another UE after renewing initialized registration. A flow of renewing initialized registration initiated by the UE2 is the same as that in the prior art and a repeated description thereof is omitted here.

It shall be noted that in the fifth embodiment of the invention, the A-CSCF3 may obtain the address information and cipher information of the UE2 from the received session request or download the IP address, port number, IK and CK of the UE2 from the D-HSS to obtain the address information and cipher information of the UE2 upon reception of the session request.

The fifth embodiment of the invention further provides a session control device in the next generation IMS, which includes:

a unit configured to obtain from a D-HSS domain name information of a second A-CSCF bound with a second UE involved in a current session when a first A-CSCF bound with a first UE receives a session request of the first UE;

a unit configured to request again a DNS for address information of an available third A-CSCF upon failing to forward the session request of the first UE to the second UE through the second A-CSCF according to the domain name information of the second A-CSCF;

a unit configured to forward the session request of the first UE to the third A-CSCF according to the address information of the third A-CSCF returned from the DNS; and a unit configured to instruct the second UE to renew initialized registration according to address information of the second UE.

The Sixth Embodiment

Figure 9:
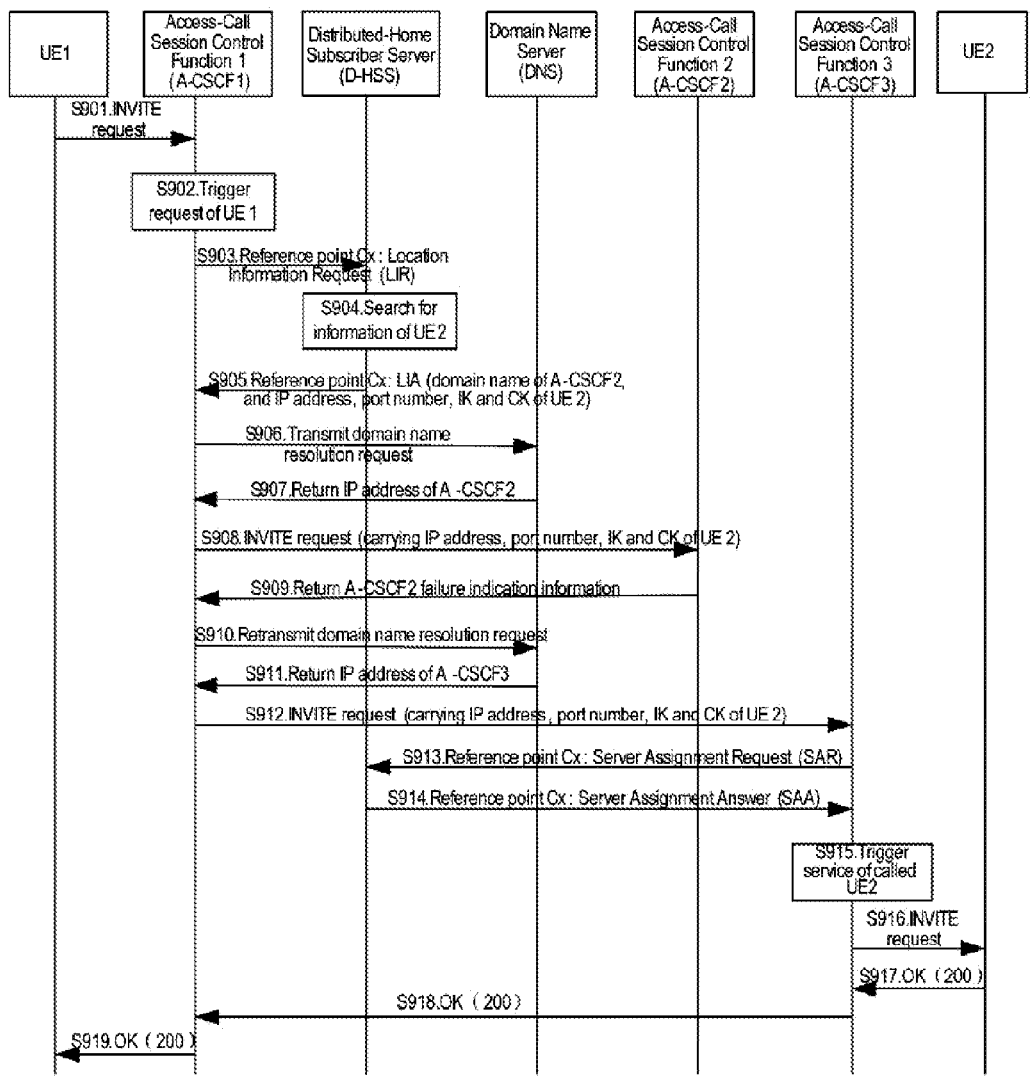
FIG. 9 illustrates a schematic flow chart of a session control method according to a sixth embodiment of the invention.

As illustrated in FIG. 9, a session control method according to the sixth embodiment of the invention includes the following steps:

where steps S901-S912 are the same as the corresponding steps S801-S812 in the fifth embodiment, so a repeated description thereof is omitted here and only the differences will be detailed below:

in step S913, the A-CSCF3 transmits the SAR to the D-HSS through the reference point Cx;

where upon reception of the INVITE session request, the A-CSCF3 determines, from a correspondence relationship between an A-CSCF and a registered UE resulting from registration of the UE, that the UE2 has not been registered with the A-CSCF3, and then transmits through the reference point Cx the SAR to the D-HSS for the iFC of the UE2;

in step S914, the D-HSS returns the SAA to the A-CSCF3 through the reference point Cx;

where the D-HSS detects whether the registration status of the UE2 is "Registered" upon reception of the SAR transmitted from the A-CSCF3, and if so, the D-HSS stores the domain name information of the available A-CSCF3 (A-CSCF3 SIP URL) and returns the SAA including the iFC of the UE2 to the A-CSCF3 through the reference point Cx;

in step S915, the A-CSCF3 triggers a called session request of the UE2 according to the iFC of the UE2 obtained from the D-HSS;

where since the A-CSCF3 obtains the iFC of the UE2, the A-CSCF3 may forward to the UE2 the INVITE session request of the UE1 including the address information and cipher information of the UE2;

in step S916, the A-CSCF3 forwards the INVITE session request to the UE2, so the UE1 and the UE2 set up a session flow to thereby switch the current session; and in steps S917-S919, the UE2 returns the 200 OK message to the UE1 through the A-CSCF3 to indicate that the UE1 and the UE2 may perform the current session upon reception of the INVITE session request. A session flow thereof is the same as that in the prior art and a repeated description thereof is omitted here.

It shall be noted that in the sixth embodiment of the invention, the A-CSCF3 may obtain the address information and cipher information of the UE2 from the received session request or download the IP address, port number, IK and CK of the UE2 from the D-HSS to obtain the address information and cipher information of the UE2 upon reception of the session request.

The sixth embodiment of the invention further provides a session control device in the next generation IMS, which includes:

a unit configured to obtain from a D-HSS domain name information of a second A-CSCF bound with a second UE involved in a current session when a first A-CSCF bound with a first UE receives a session request of the first UE;

a unit configured to request again a DNS for address information of an available third A-CSCF upon failing to forward the session request of the first UE to the second UE through the second A-CSCF according to the domain name information of the second A-CSCF;

a unit configured to forward the session request of the first UE to the third A-CSCF according to the address information of the third A-CSCF returned from the DNS; and a unit configured to obtain service registration information iFC of the second UE from the D-HSS and switch the current session to the second UE according to address information and iFC of the second UE.

The Seventh Embodiment

In the seventh embodiment, a traditional DNS is replaced with an E-DNS, which may perform the following functions as compared with the traditional DNS.

Figure 10:
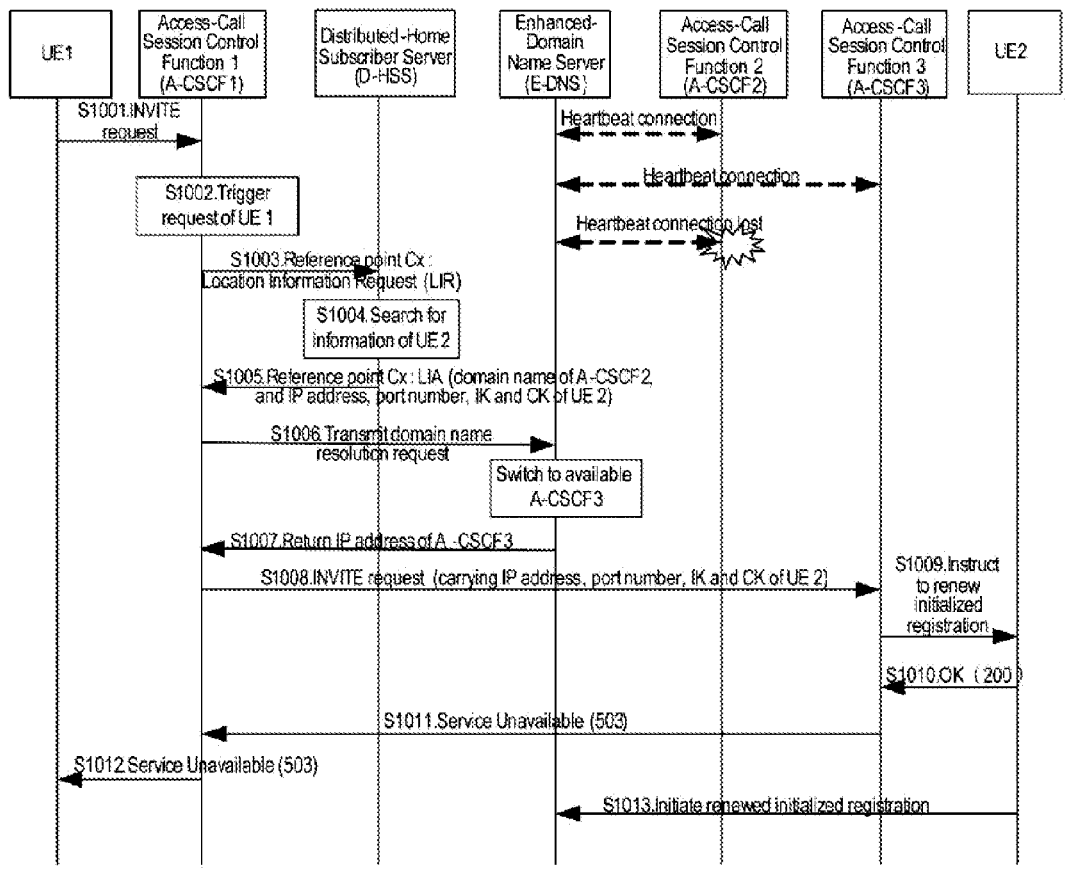
FIG. 10 illustrates a schematic flow chart of a session control method according to a seventh embodiment of the invention.

The E-DNS may monitor in real time the statuses of A-CSCFs, for example, set up heartbeat connections with A-CSCFs in a specific region. When a UE initiates a session request, if it is found that the A-CSCF bounded with the UE fails, an available A-CSCF may be selected in a load-balance policy as a session control function. Thus as illustrated in FIG. 10, a session control method according to the seventh embodiment of the invention includes the following steps:

where steps S1001-S1005 are the same as the corresponding steps S801-S805 in the fifth embodiment and steps S1008-S1013 are the same as the corresponding steps S812-S817 in the fifth embodiment, so a repeated description thereof is omitted here and only the differences will be detailed below:

in step S1006, the A-CSCF1 transmits to the E-DNS a request for resolving the domain name information of the A-CSCF2 according to the LIA returned from the D-HSS; and in step S1007, the E-DNS detects that the A-CSCF2 fails and returns the address information of the available A-CSCF3, i.e., the IP address of the A-CSCF3, to the A-CSCF1.

The E-DNS may monitor the A-CSCF2 and the A-CSCF3 in a monitoring method, possibly a heartbeat monitoring method, that is, the E-DNS sets up heartbeat connections with the A-CSCF2 and the A-CSCF3, detects that the A-CSCF2 fails and returns the IP address of the available A-CSCF3 to the A-CSCF1.

It shall be noted that in the seventh embodiment of the invention, the A-CSCF3 may obtain the address information and cipher information of the UE2 from the received session request or download the IP address, port number, IK and CK of the UE2 from the D-HSS to obtain the address information and cipher information of the UE2 upon reception of the session request.

The seventh embodiment of the invention further provides a session control device in the next generation IMS, which includes:

a unit configured to obtain from a D-HSS domain name information of a second A-CSCF bound with a second UE involved in a current session when a first A-CSCF bound with a first UE receives a session request of the first UE and transmit to an E-DNS a request for resolving the domain name information of the second A-CSCF;

a unit configured to transmit address information of an available third A-CSCF to the first A-CSCF upon determining, from results of monitoring A-CSCFs, that the second A-CSCF fails;

a unit configured to forward the session request of the first UE to the third A-CSCF according to the address information of the third A-CSCF; and a unit configured to instruct the second UE to renew initialized registration according to address information of the second UE.

The Eighth Embodiment

Figure 11:
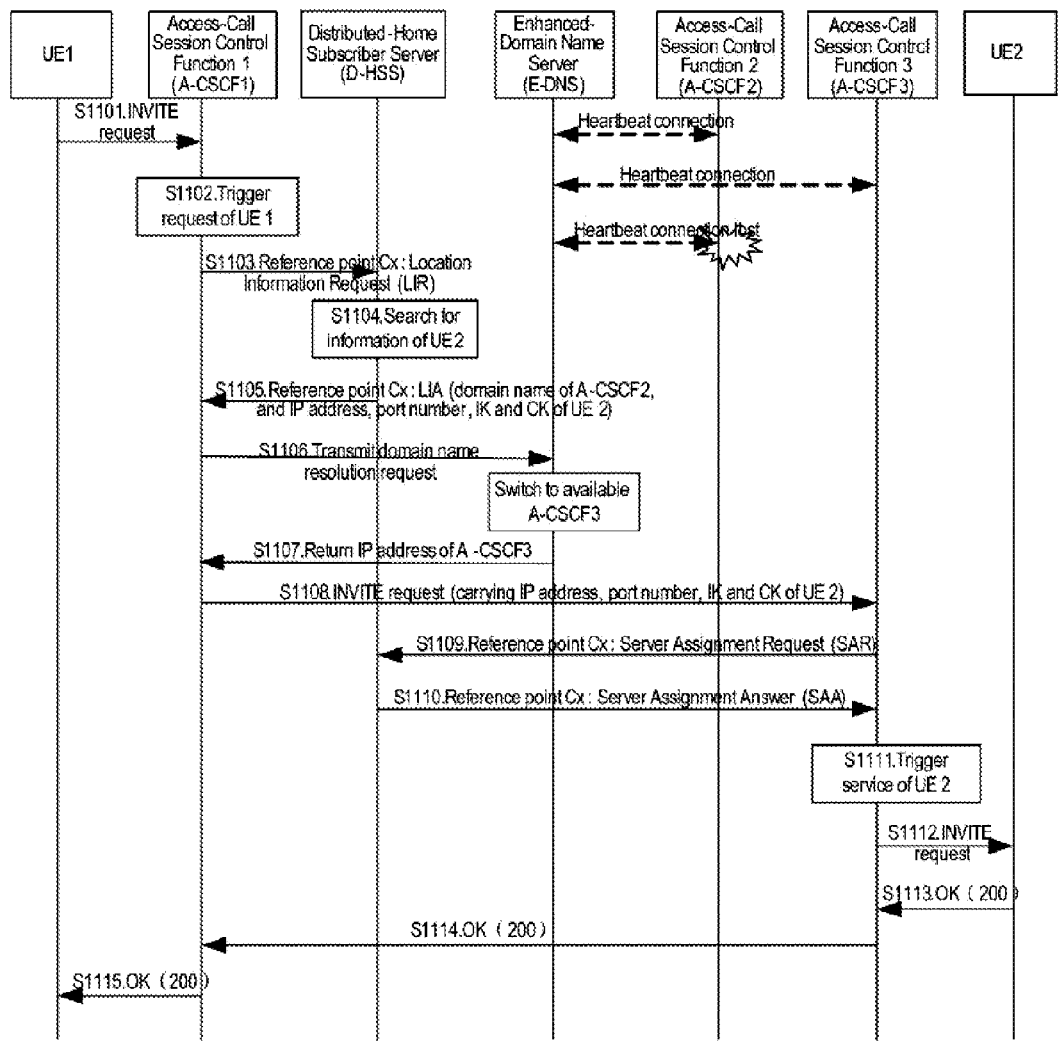
FIG. 11 illustrates a schematic flow chart of a session control method according to an eighth embodiment of the invention.

As illustrated in FIG. 11, a session control method according to the eighth embodiment of the invention includes the following steps:

where steps S1101-S1108 are the same as the corresponding steps S1001-S1008 in the seventh embodiment and steps S1109-S1115 are the same as the corresponding steps S913-S919 in the sixth embodiment, so a repeated description thereof is omitted here.

It shall be noted that in the eighth embodiment of the invention, the A-CSCF3 may obtain the address information and cipher information of the UE2 from the received session request or download the IP address, port number, IK and CK of the UE2 from the D-HSS to obtain the address information and cipher information of the UE2 upon reception of the session request.

The eighth embodiment of the invention further provides a session control device in the next generation IMS, which includes:

a unit configured to obtain from a D-HSS domain name information of a second A-CSCF bound with a second UE involved in a current session when a first A-CSCF bound with a first UE receives a session request of the first UE and transmit to an E-DNS a request for resolving the domain name information of the second A-CSCF;

a unit configured to transmit address information of an available third A-CSCF to the first A-CSCF upon determining, from results of monitoring A-CSCFs, that the second A-CSCF fails;

a unit configured to forward the session request of the first UE to the third A-CSCF according to the address information of the third A-CSCF; and a unit configured to obtain service registration information iFC of the second UE from the D-HSS and switch the current session to the second UE according to address information and iFC of the second UE.

With the session control in the next IMS according to the embodiments of the invention, address information of a UE is stored into a D-HSS so that when the UE is called, an available A-CSCF may obtain the address information of the called UE from the D-HSS and instruct the UE to renew initialized registration or switch a session according to the address information of the called UE.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. A session control method in an IMS, comprising:

forwarding, by a third Interrogation-Call Session Control Function, I-CSCF, a session request of a first User Equipment (UE) to an available third Service-Call Session Control Function, S-CSCF, according to address information of the third S-CSCF if a second S-CSCF bound with a second User Equipment (UE) involved in a current session fails, upon reception of the session request of the first UE transmitted from a first S-CSCF bound with the first UE; and instructing, by the third S-CSCF, the second UE to renew initialized registration through a second Proxy-Call Session Control Function, P-CSCF, bound with the second UE according to address information of the second P-CSCF or obtaining service registration information iFC of the second UE from an HSS and switching the current session to the second UE according to the address information of the second P-CSCF bound with the second UE and the iFC, wherein forwarding, by a third I-CSCF, a session request of a first UE to an available third S-CSCF, according to address information of the third S-CSCF if a second S-CSCF bound with a second UE involved in a current session fails comprises:

requesting, by the third I-CSCF, an Enhanced-Domain Name Server, E-DNS, for address information of the second S-CSCF;

transmitting, by the E-DNS, address information of the available third S-CSCF to the third I-CSCF upon determining, from results of monitoring S-CSCFs, that the second S-CSCF fails; and forwarding, by the third I-CSCF, the session request of the first UE to the third S-CSCF according to the address information of the third S-CSCF returned from the E-DNS, and wherein before the third I-CSCF receives the session request of the first UE transmitted from the first S-CSCF bound with the first UE, the method further comprises:

requesting, by the first S-CSCF, the E-DNS for address information of a second I-CSCF to which the second UE belongs upon reception of the session request of the first UE;

transmitting, by the E-DNS, address information of the available third I-CSCF to the first S-CSCF upon determining, from results of monitoring I-CSCFs, that the second I-CSCF fails; and forwarding, by the first S-CSCF, the session request of the first UE to the third I-CSCF according to the address information of the third I-CSCF.

2. The method of claim 1, wherein forwarding, by a third I-CSCF, a session request of a first UE to an available third S-CSCF, according to address information of the third S-CSCF if a second S-CSCF bound with a second UE involved in a current session fails comprises:

requesting, by the third I-CSCF, a Domain Name Server, DNS, for address information of the second S-CSCF;

requesting, by the third I-CSCF, again the DNS for address information of the available third S-CSCF upon failing to transmit the session request of the first UE to the second S-CSCF according to the address information of the second S-CSCF; and forwarding, by the third I-CSCF, the session request of the first UE to the third S-CSCF according to the address information of the third S-CSCF returned from the DNS.

3. The method of claim 2, further comprising: before the third I-CSCF receives the session request of the first UE transmitted from the first S-CSCF bound with the first UE, obtaining, by the first S-CSCF, address information of a second I-CSCF to which the second UE belongs from the DNS upon reception of the session request of the first UE, and forwarding the session request of the first UE to the second I-CSCF; and requesting again the DNS for address information of the available third I-CSCF upon failing to forward the session request of the first UE, and transmitting the session request of the first UE to the third I-CSCF according to the address information of the third I-CSCF.

4. The method of claim 1, wherein the third I-CSCF obtains the address information of the second P-CSCF from the HSS and carries the address information of the second P-CSCF in the session request forwarded to the third S-CSCF; or the third S-CSCF obtains the address information of the second P-CSCF together with the service registration information iFC of the second UE from the HSS.

5. The method of claim 1, wherein the third S-CSCF further notifies the first UE of a failure of switching the session through the second P-CSCF bound with the second UE after instructing the second UE to renew initialized registration through the second P-CSCF according to the address information of the second P-CSCF.

6. The method of claim 1, wherein the address information of the second P-CSCF comprises an IP address and port number of the second P-CSCF.

7. A session control system in an IMS, comprising:

a first User Equipment (UE), a second User Equipment (UE), a third Interrogation-Call Session Control Function, I-CSCF, a first Service-Call Session Control Function, S-CSCF, bound with the first UE, a second S-CSCF bound with the second UE involved in a current session, a third S-CSCF, a second Proxy-Call Session Control Function, P-CSCF, bound with the second UE and a Home Subscriber Server, HSS, wherein:

the third I-CSCF is adapted to forward a session request of the first UE to the available third S-CSCF according to address information of the third S-CSCF if the second S-CSCF fails upon reception of the session request of the first UE transmitted from the first S-CSCF; and the third S-CSCF is adapted to instruct the second UE to renew initialized registration through the second P-CSCF according to address information of the second P-CSCF or to obtain service registration information iFC of the second UE from the HSS and switching the current session to the second UE according to the address information of the second P-CSCF and the iFC, wherein the session control system further comprises: an Enhanced-Domain Name Server, E-DNS, the third I-CSCF is further adapted to request the E-DNS for address information of the second S-CSCF;

the E-DNS is adapted to transmit address information of the available third S-CSCF to the third I-CSCF upon determining, from results of monitoring S-CSCFs, that the second S-CSCF fails; and the third I-CSCF is further adapted to forward the session request of the first UE to the third S-CSCF according to the address information of the third S-CSCF returned from the E-DNS, and wherein the session control system further comprises: a second I-CSCF to which the second UE belongs, the first S-CSCF is adapted to request the E-DNS for address information of the second I-CSCF upon reception of the session request of the first UE;

the E-DNS is further adapted to transmit address information of the available third I-CSCF to the first S-CSCF upon determining, from results of monitoring I-CSCFs, that the second I-CSCF fails; and the first S-CSCF is further adapted to forward the session request of the first UE to the third I-CSCF according to the address information of the third I-CSCF.

8. The session control system of claim 7, further comprising: a Domain Name Server, DNS wherein:

the first S-CSCF is further adapted to obtain address information of the second I-CSCF from the DNS upon reception of the session request of the first UE and forward the session request of the first UE to the second I-CSCF; and request again the DNS for address information of the available third I-CSCF upon failing to forward the session request of the first UE and transmit the session request of the first UE to the third I-CSCF according to the address information of the third I-CSCF.

9. A session control method in the next generation IMS, comprising:

forwarding, by a first Access-Call Session Control Function, A-CSCF, bound with a first User Equipment (UE), a session request of the first UE to an available third A-CSCF according to address information of the third A-CSCF if a second A-CSCF bound with a second User Equipment (UE) involved in a current session fails, upon reception of the session request of the first UE; and instructing, by the third A-CSCF, the second UE to renew initialized registration according to address information of the second UE, or obtaining service registration information iFC of the second UE from a Distributed-Home Subscriber Server, D-HSS, and switching the current session to the second UE according to the address information and iFC of the second UE, wherein forwarding, by a first A-CSCF bound with a first UE, a session request of the first UE to an available third A-CSCF according to address information of the third A-CSCF if a second A-CSCF bound with a second UE involved in a current session fails comprises:

obtaining, by the first A-CSCF, domain name information of the second A-CSCF from the D-HSS, and transmitting to an E-DNS a request for resolving the domain name information of the second A-CSCF;

transmitting, by the E-DNS, address information of the available third A-CSCF to the first A-CSCF upon determining, from results of monitoring A-CSCFs, that the second A-CSCF fails; and forwarding, by the first A-CSCF, the session request of the first UE to the third A-CSCF according to the address information of the third A-CSCF, and wherein the first A-CSCF obtains the address information of the second UE together with the domain name information of the second A-CSCF from the D-HSS and carries the address information of the second UE in the session request of the first UE forwarded to the third A-CSCF; and/or the first A-CSCF obtains cipher information of the second UE from the D-HSS and carries the cipher information in the session request forwarded to the third A-CSCF, and the third A-CSCF uses the cipher information to encrypt information transmitted to the second UE.

10. The method of claim 9, wherein forwarding, by a first A-CSCF bound with a first UE, a session request of the first UE to an available third A-CSCF according to address information of the third A-CSCF if a second A-CSCF bound with a second UE involved in a current session fails comprises:

requesting, by the first A-CSCF, again a Domain Name Server, DNS, for address information of the available third A-CSCF upon failing to forward the session request of the first UE to the second UE through the second A-CSCF according to the domain name information of the second A-CSCF; and forwarding, by the first A-CSCF, the session request of the first UE to the third A-CSCF according to the address information of the third A-CSCF returned from the DNS.

11. The method of claim 10, wherein the first A-CSCF obtains the address information of the second UE together with the domain name information of the second A-CSCF from the D-HSS and carries the address information of the second UE in the session request of the first UE forwarded to the third A-CSCF; and the first A-CSCF obtains cipher information of the second UE from the D-HSS and carries the cipher information in the session request forwarded to the third A-CSCF, and the third A-CSCF uses the cipher information to encrypt information transmitted to the second UE.

12. The method of claim 10, wherein the third A-CSCF obtains the address information of the second UE from the D-HSS; and/or the third A-CSCF obtains cipher information of the second UE from the D-HSS and uses the cipher information to encrypt information transmitted to the second UE.

13. The method of claim 9, wherein the third A-CSCF obtains the address information of the second UE from the D-HSS; and/or the third A-CSCF obtains cipher information of the second UE from the D-HSS and uses the cipher information to encrypt information transmitted to the second UE.

14. The method of claim 9, wherein the third A-CSCF further notifies the first UE of a failure of switching the session after instructing the second UE to renew initialized registration according to the address information of the second UE.

15. The method of claim 9, wherein the address information of the second UE comprises an IP address and port number of the second UE.

16. A session control system in the next generation IMS, comprising:
  a first User Equipment (UE), a second User Equipment (UE), a first Access-Call Session Control Function, A-CSCF, bound with the first UE, a second A-CSCF bound with the second UE involved in a current session, a third A-CSCF and a Distributed-Home Subscriber Server, D-HSS, wherein:
  the first A-CSCF is adapted to forward a session request of the first UE to the available third A-CSCF according to address information of the third A-CSCF if the second A-CSCF fails upon reception of the session request of the first UE; and
  the third A-CSCF is adapted to instruct the second UE to renew initialized registration according to address information of the second UE, or to obtain service registration information iFC of the second UE from the D-HSS and switch the current session to the second UE according to the address information and iFC of the second UE, wherein the session control system further comprises: an Enhanced-Domain Name Server, E-DNS,
  the first A-CSCF is further adapted to obtain domain name information of the second A-CSCF from the D-HSS, and transmit to the E-DNS a request for resolving the domain name information of the second A-CSCF;
  the E-DNS is adapted to transmit address information of the available third A-CSCF to the first A-CSCF upon determining, from results of monitoring A-CSCFs, that the second A-CSCF fails; and
  the first A-CSCF is further adapted to forward the session request of the first UE to the third A-CSCF according to the address information of the third A-CSCF,
and wherein the first A-CSCF is further adapted to obtain the address information of the second UE together with the domain name information of the second A-CSCF from the D-HSS and carry the address information of the second UE in the session request of the first UE forwarded to the third A-CSCF; and/or
  the first A-CSCF is further adapted to obtain cipher information of the second UE from the D-HSS and carry the cipher information in the session request forwarded to the third A-CSCF, and the third A-CSCF is further adapted to use the cipher information to encrypt information transmitted to the second UE.

* * * * *